(12) United States Patent
Quenzer

(10) Patent No.: US 11,661,130 B2
(45) Date of Patent: May 30, 2023

(54) MOTORIZED DROPPER POST ASSEMBLY

(71) Applicant: Trek Bicycle Corporation, Waterloo, WI (US)

(72) Inventor: Jon Quenzer, German Valley, IL (US)

(73) Assignee: Trek Bicycle Corporation, Waterloo, WI (US)

( * ) Notice: Subject to any disclaimer, the term of this patent is extended or adjusted under 35 U.S.C. 154(b) by 368 days.

(21) Appl. No.: 16/862,695

(22) Filed: Apr. 30, 2020

(65) Prior Publication Data

US 2020/0346703 A1 Nov. 5, 2020

Related U.S. Application Data

(60) Provisional application No. 62/840,440, filed on Apr. 30, 2019.

(51) Int. Cl.
*B62J 1/08* (2006.01)
*F16H 25/20* (2006.01)

(52) U.S. Cl.
CPC ............... *B62J 1/08* (2013.01); *F16H 25/20* (2013.01); *B62J 2001/085* (2013.01); *F16H 2025/2075* (2013.01)

(58) Field of Classification Search
CPC .................................... B62J 1/08; F16H 25/20
See application file for complete search history.

(56) References Cited

U.S. PATENT DOCUMENTS

2020/0307729 A1* 10/2020 Shirai

FOREIGN PATENT DOCUMENTS

| CN | 103770863 A | 5/2014 |
|---|---|---|
| CN | 104847835 B | 1/2019 |
| CN | 204716859 | 10/2019 |
| GB | 189708517 A | 2/1898 |
| NL | 8301451 A | 11/1984 |
| WO | WO-2016100572 A2 * | 6/2016 |

* cited by examiner

*Primary Examiner* — Anthony D Barfield
(74) *Attorney, Agent, or Firm* — Bell & Manning, LLC

(57) ABSTRACT

A dropper post assembly includes a lower tube and an upper tube slidably mounted to the lower tube. The assembly includes a motor with a motor shaft that rotates bi-directionally. The assembly also includes a lead screw that is directly or indirectly mounted to the motor shaft such that the lead screw rotates in unison with the motor shaft. The assembly also includes a lead screw nut threaded onto the lead screw and mounted within the upper tube such that the lead screw nut is unable to rotate relative to the upper tube. The assembly further includes a lead screw sheath configured to receive at least a portion of the lead screw that extends past an upper end of the lead screw nut.

19 Claims, 15 Drawing Sheets

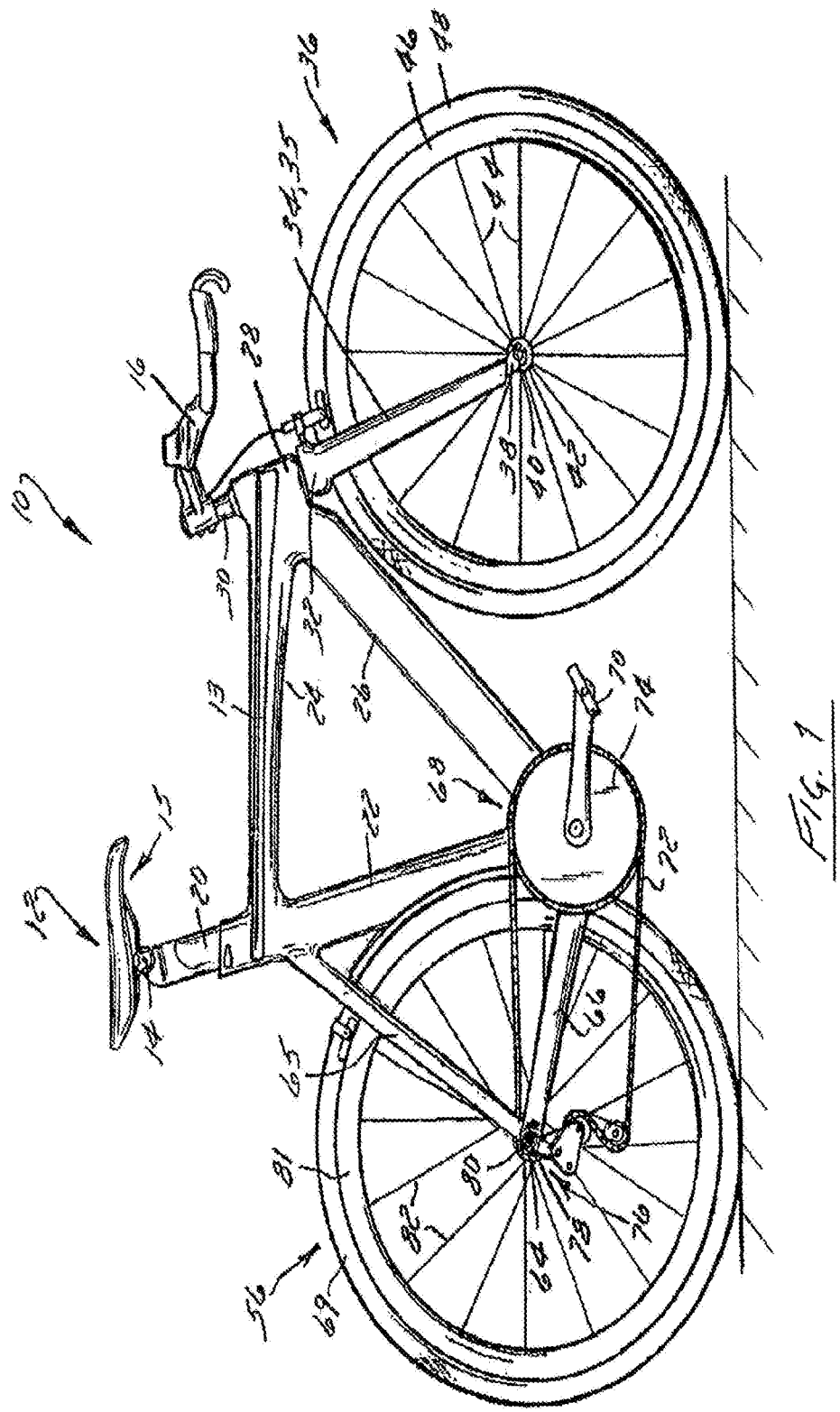

MOTORIZED DROPPER POST ASSEMBLY

CROSS-REFERENCE TO RELATED APPLICATION

The present application claims the priority benefit of U.S. Provisional Patent App. No. 62/840,440 filed on Apr. 30, 2019, the entire disclosure of which is incorporated herein by reference.

BACKGROUND

Bicycles are typically designed to fit a range of riders that may have different heights, weights, strength levels, etc. To comfortably accommodate a range of riders, various components of the bicycle can be adjustable. For example, a saddle (or seat) of the bicycle can typically be raised to accommodate taller riders and lowered to accommodate shorter riders. In traditional bicycles, adjusting the dropper post (i.e., the post to which the saddle is mounted) required use of a wrench or other tool to loosen/tighten a fastener that maintains the dropper post at a desired height within the seat tube of the bicycle frame. Many newer bicycles enable the user to adjust the height of the saddle without the use of a tool.

SUMMARY

An illustrative dropper post assembly includes a lower tube and an upper tube slidably mounted to the lower tube. The assembly includes a motor with a motor shaft that rotates bi-directionally. The assembly also includes a lead screw that is directly or indirectly mounted to the motor shaft such that the lead screw rotates in unison with the motor shaft. The assembly also includes a lead screw nut threaded onto the lead screw and mounted within the upper tube such that the lead screw nut is unable to rotate relative to the upper tube. The assembly further includes a lead screw sheath configured to receive at least a portion of the lead screw that extends past an upper end of the lead screw nut.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 1 depicts a bicycle with a motorized dropper post assembly in accordance with an illustrative embodiment.

DETAILED DESCRIPTION

Figure 2A:
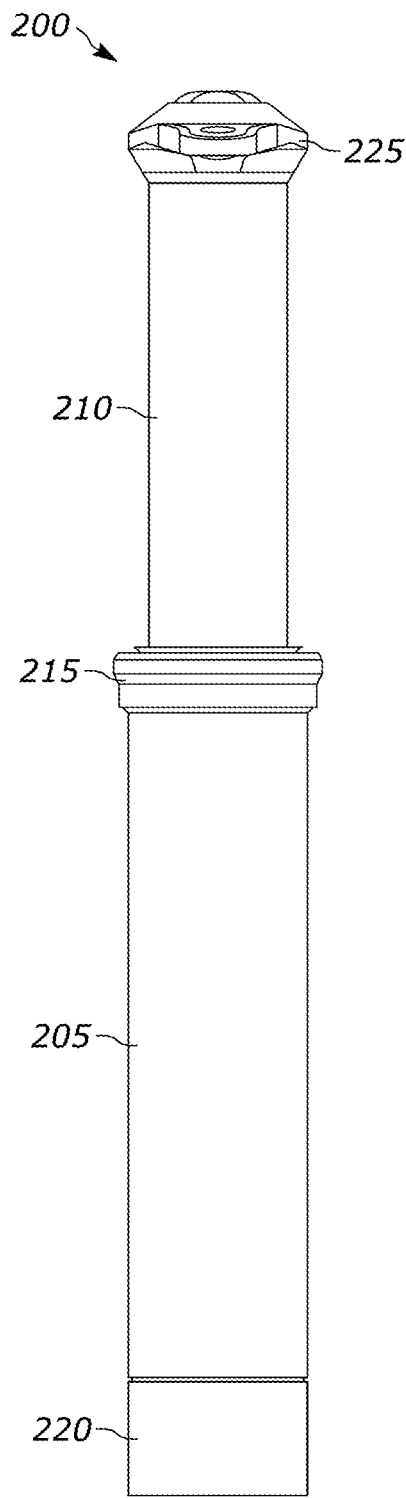
FIG. 2A is a side view of a motorized dropper post assembly in accordance with an illustrative embodiment.

A typical bicycle dropper post is small in diameter (e.g., 31.6 millimeters (mm) or 34.9 mm), and a challenge in designing dropper posts involves minimizing the height of the internal mechanisms to allow the post to fit into small frames. In a typical linear motion application that has loads of several hundred pounds, the bearing assembly that supports the lead screw and prevents the motor from seeing an axial load has to be designed to operate efficiently while withstanding the high loads. Typically, this is done with multiple bearings that support the end of the lead screw radially and axially. This combination of bearings in the small diameter used for a dropper post is expensive, occupies a large space within the post, and also generates significant noise that results from numerous rolling elements spinning at high speed.

Described herein is a motorized dropper post that allows a user to raise and lower the saddle height of a bicycle via a motorized assembly. The motorized dropper post includes sound dampening components to reduce noise resulting from operation of the motor and movement of the dropper post. The sound dampening components also help to maintain alignment of the moving portions of the motorized dropper post. The motorized dropper post also includes a series of o-rings that help reduce wear and tear on system components. As discussed in more detail below, the o-rings also provide flexibility and help to prevent overtightening (and binding) of the system components. The proposed motorized dropper post can also utilize just a single bearing mechanism, which allows the dropper to operate efficiently under loads required to move the saddle, while also preventing high axial loads from being transferred into a motor of the system. Use of a single ball bearing mechanism allows the proposed system to be low cost, compact, and to generate a very limited amount of noise, which improves the experience of the user.

FIG. 1 depicts a bicycle 10 with a motorized dropper post assembly 20 in accordance with an illustrative embodiment. The bicycle 10 includes a frame 13 to which a seat assembly 12 and handlebars 16 are attached. A seat clamp 14 is engaged with an underside 15 of seat assembly 12 and cooperates with the motorized dropper post assembly 20 that slidably engages a seat tube 22 of frame 13. The motorized dropper post assembly 20, which is described in more detail below, enables automated low noise adjustment of the seat height. A top tube 24 and a down tube 26 extend forwardly from seat tube 22 to a head tube 28 of frame 13.

Handlebars 16 of the bicycle 10 are connected to a steerer tube 30 that passes through head tube 28 and engages a fork crown 32. A pair of fork blades 34, 35 extend from generally opposite ends of fork crown 32 and are constructed to support a front wheel assembly 36 at an end thereof or fork tip 38. The fork blades 34, 35 can be part of a suspension bicycle fork or a rigid bicycle fork. As also shown in FIG. 1, fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. The crankset 68 includes pedals 70 that are operationally connected to a flexible drive such as a chain 72 via a chain ring or sprocket 74. Rotation of the chain 72 communicates a drive force to a rear section 76 of the bicycle 10 having a gear cluster 78 positioned thereat. The gear cluster 78 is generally concentrically orientated with respect to the rear axle 64 and includes a number of variable diameter gears. The gear cluster 78 is operationally connected to a hub 80 associated with a rear tire 69 of rear wheel assembly 56. A number of spokes 82 extend radially between the hub 80 and a rim 81 that supports tire 69 of rear wheel assembly 56. As is commonly understood, rider operation of the pedals 70 drives the chain 72 thereby driving the rear tire 69 which in turn propels the bicycle 10.

FIG. 2A is a side view of a motorized dropper post assembly 200 in accordance with an illustrative embodiment. The motorized dropper post assembly 200 includes a lower tube 205, an upper tube 210 that slidably mates with the lower tube 205, a collar 215 at the interface between the lower tube 205 and the upper tube 210, and a motor shroud 220 that is used to house and secure a motor. The motorized dropper post assembly 200 also includes a saddle bracket 225 to which a saddle can be mounted. In one embodiment, the lower tube 205 and the upper tube 210 can be made of carbon fiber, stainless steel, aluminum, etc.

As discussed in more detail below, upon activation of a motor within the assembly, the upper tube 210 moves up or down relative to the lower tube 205 such that a saddle mounted to the saddle bracket 225 can be adjusted to a desired height for a given rider. In an illustrative embodiment, the collar 215 includes one or more components that form a seal between the upper tube 210 and the lower tube 205 to prevent dirt, dust, water, etc. from getting inside of the assembly. The collar 215 can also be used to secure the assembly to a seat tube of the bicycle frame. For example, in one embodiment, the collar 215 can include a first set of threads that secure the collar 215 to the lower tube 205 and a second set of threads that secure the collar 215 to the saddle tube of the bicycle frame.

Figure 2B:
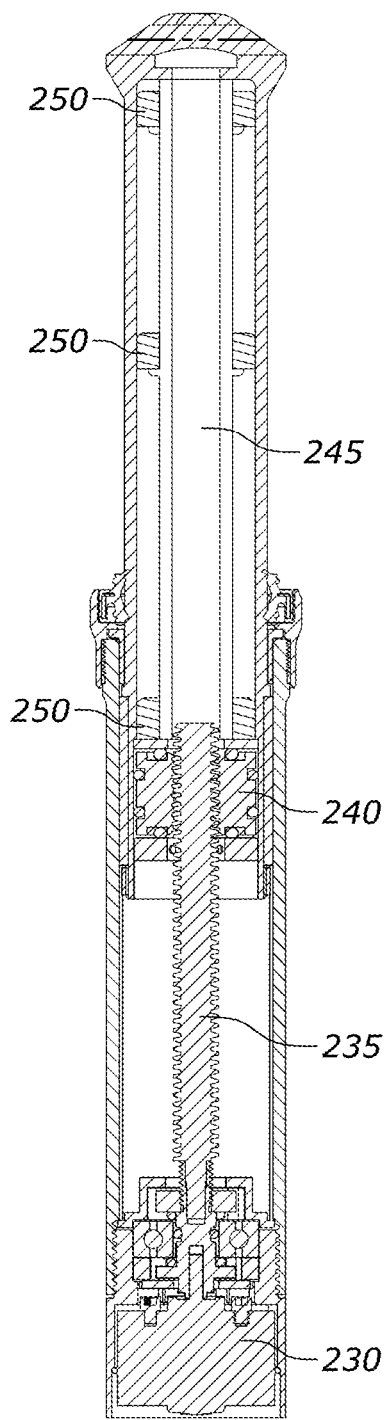
FIG. 2B is a cross-sectional view of the motorized dropper post assembly in accordance with an illustrative embodiment.

FIG. 2B is a cross-sectional view of the motorized dropper post assembly 200 in accordance with an illustrative embodiment. As shown, the interior of the motorized dropper post assembly 200 includes a motor 230, a lead screw 235, a lead screw nut 240, a lead screw sheath 245, and a plurality of noise dampening rings 250. The motor 230 is mounted to and secured by the motor shroud 220, and the motor shroud 220 is mounted to the lower tube 205. The motor 230 is also attached to the lead screw 235 such that rotation of the motor shaft results in corresponding rotation of the lead screw 235. The lead screw nut 240 is mounted to the upper tube 210 and is also threaded onto the lead screw 235 such that rotation of the lead screw 235 causes the lead screw nut 240 (and the upper tube 210 to which the lead screw nut 240 is mounted) to translate up or down depending on the direction of rotation of the lead screw 235. In an illustrative embodiment, the lead screw nut 240 is made from plastic, rubber, or another non-metallic material to reduce the amount of noise made as the lead screw 235 rotates. Alternatively, a different material may be used to form the lead screw nut 240, such as carbon, stainless steel, etc.

The cross-sectional view of FIG. 2B depicts the motorized dropper post assembly in an extended configuration in which the upper tube 210 is almost fully extended. As shown, an upper end of the lead screw 235 is positioned in the lead screw sheath 245. As the upper tube 210 is lowered via rotation of the lead screw 235, more of the lead screw 235 extends into the lead screw sheath 245. The lead screw sheath 245 is used to provide structural support for the lead screw 235, to maintain alignment of the lead screw 235, and to dampen noise generated by rotation of the lead screw 235. The added structural support of the lead screw sheath 245 reduces the risk of the lead screw bending during impact to the assembly. An interior surface of the lead screw sheath 245 can be threaded or unthreaded, depending on the embodiment. In an illustrative embodiment, the lead screw sheath 245 can be made of polyoxymethylene (POM) or another polymer such as Delrin®. Alternatively, other material(s) may be used to form the lead screw sheath 245, such as acetal, polyacetal, other polyoxymethylene compounds, a cellular polyurethane elastomer, etc.

The noise dampening rings 250 are positioned between an inner wall of the upper tube 210 and the lead screw sheath 245. The noise dampening rings 250 are used to provide structural support for the lead screw sheath 245 and also to dampen vibrations in the assembly to reduce the noise generated when the lead screw rotates. In some embodiments, the lead screw sheath 245 can include grooves that support c-clips, and the c-clips can be used to hold the noise dampening rings 250 in place. An exterior surface of the lead screw sheath 245 can also include tabs, rings, or other protrusions configured to support and the noise dampening rings 250. In one embodiment, the noise dampening rings 250 can be made from Sorbothane®. Alternatively, a different material may be used such as a different type of synthetic viscoelastic urethane polymer, rubber, polyurethane, a cellular polyurethane elastomer (e.g., Cellasto), etc. While the embodiment shown includes 3 noise dampening rings, it is to be understood that a different number may be used in alternative embodiments. For example, 1, 2, 4, 5, 6, etc. noise dampening rings can be positioned within the upper tube in alternative implementations. In an alternative embodiment, an entire inner surface of the upper tube 210 can be covered with a single large dampening ring and/or a noise dampening coating.

Figure 2D:
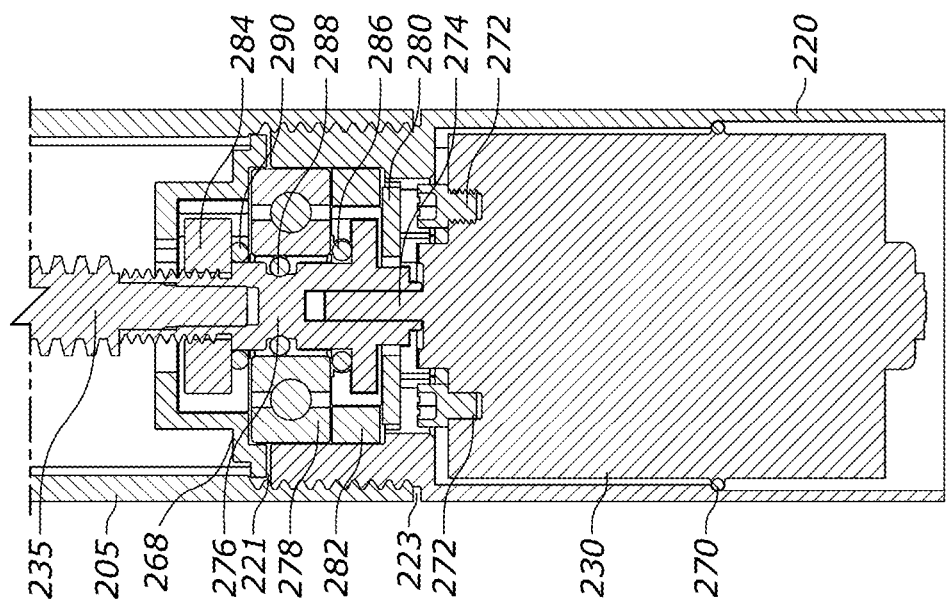
FIG. 2D is a partial cross-sectional view of a lower portion of the lower tube in accordance with an illustrative embodiment.
Figure 2C:
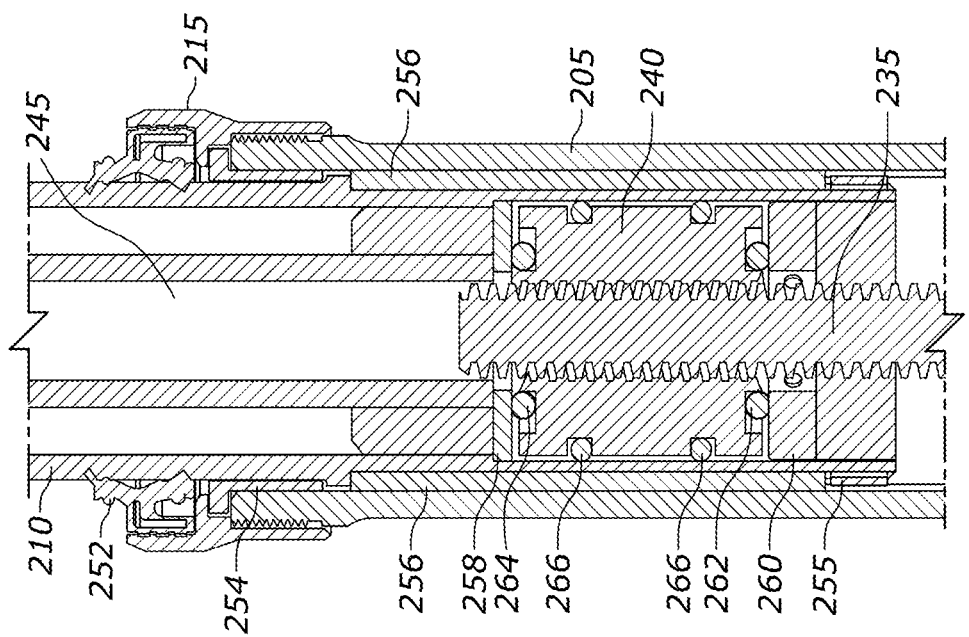
FIG. 2C is a partial cross-sectional view of an upper portion of the lower tube in accordance with an illustrative embodiment.

FIG. 2C is a partial cross-sectional view of an upper portion of the lower tube 205 in accordance with an illustrative embodiment. FIG. 2C also depicts the interface between the lower tube 205 and the upper tube 210. As shown, the collar 215 is threaded onto an outer surface of the lower tube 205. Mounted to the collar 215 is a seal 252 that rests upon an outer surface of the upper tube 210. The seal 252 forms a seal around the perimeter of the upper tube 210 to prevent dirt, dust, water, and other contaminants from getting into the interior of the motorized dropper post assembly. The seal 252 can be made from silicon, rubber, plastic, etc., depending on the implementation. In some embodiments, the collar 215 and/or seal 252 can include a small opening to allow air to flow through the assembly. The small opening can be in fluid communication with a drain positioned in the lower tube 205. The drain is described in more detail below.

Positioned between the upper tube 210 and the lower tube 205 is an upper bushing 254 that helps to secure and guide the upper tube 210 as it moves relative to the lower tube 205. A flange of the upper bushing 254 is positioned between a flange of the collar 215 and the top surface of the lower tube 205 such that the upper bushing 254 remains stationary as the upper tube 210 moves. As shown, when the collar 215 is threaded onto the lower tube 205, the flange of the upper bushing 254 is sandwiched between the flange of the collar 215 and the top surface of the lower tube 205. A lower bushing 255 is mounted to a bottom portion of the upper tube 210 and moves in unison with the upper tube 210. The lower bushing 255 forms the interface between the bottom portion of the upper tube 210 and the inner surface of the lower tube 205.

As also shown, a pair of anti-rotation keys 256 are mounted to the outer surface of the upper tube 210. In an illustrative embodiment, the anti-rotation keys 256 mate with corresponding grooves on the interior surface of the lower tube 205 such that the upper tube 210 is unable to rotate relative to the lower tube 205. While two anti-rotation keys are depicted, alternative embodiments may include fewer or additional anti-rotation keys, such as 1, 3, 4, 5, etc.

A nut assembly of the motorized dropper post assembly includes the lead screw nut 240, an upper nut holder 258, a lower nut holder 260, a lower nut o-ring 262, an upper nut o-ring 264, and a pair of radial nut o-rings 266. In alternative embodiments, the nut assembly may include fewer, additional, and/or different components. The upper nut holder 258 helps to hold the upper nut o-ring 264 in place as the nut assembly translates up and down the lead screw 235. Similarly, the lower nut holder 260 helps to hold the lower nut o-ring 262 in place as the nut assembly translates in response to rotation of the lead screw 235. An upper surface of the lead screw nut 240 includes an upper groove that receives the upper nut o-ring 264, a lower surface of the lead screw nut 240 includes a lower groove that receives the lower nut o-ring 262, and a pair of side grooves are formed in the outer side surface of the lead screw nut 240 to receive the pair of radial nut o-rings 266.

The upper nut o-ring 264, the lower nut o-ring 262, and the pair of radial nut o-rings 266 act to float the lead screw nut 240 within the upper tube 210. As a result, when the assembly is in a normal operating state (i.e., not topped out or bottomed out), the lead screw nut 240 does not make direct contact with the upper nut holder 258, the lower nut holder 260, or the inner surface of the upper tube 210. This configuration of o-rings allows the lead screw nut 240 to move and make up for tolerances in the concentricity between components and the angles between components. As a result, the lead screw nut 240 is less likely to bind within the upper tube 210. The upper nut o-ring 264 and the lower nut o-ring 262 also provide a cushion that help prevent the lead screw nut 240 from binding to the lead screw 235 during top out and bottom out conditions (i.e., conditions where the top tube 210 is fully extended and fully compressed, respectively). If the lead screw nut 240 binds to the lead screw 235, the motor may not have sufficient torque to spin the lead screw 235 and the assembly can become stuck. While 4 nut o-rings are depicted in FIG. 2C, in alternative embodiments fewer or additional nut o-rings may be used.

FIG. 2D is a partial cross-sectional view of a lower portion of the lower tube 205 in accordance with an illustrative embodiment. As shown, the motor shroud 220 is threaded into threads positioned on the inner surface of the lower portion of the lower tube 205. In alternative embodiments, the motor shroud 220 can be mounted to the lower tube 205 by a different method, such as latches, one or more fasteners, adhesive, etc. As shown, an upper surface of the motor shroud 220 includes a stop 268 that is designed to contact a bottom surface the upper tube 210 such that the upper tube 210 is prevented from further downward travel. The motor shroud 220 includes an upper portion and a lower portion separated by a closed cell foam washer 221 to prevent water leakage into the motor 230, etc. Alternatively, the motor shroud 220 can be an integral component that does not have upper and lower portions. A drain 223 is formed between the lower tube 205 and the motor shroud 220. In an illustrative embodiment, components of the assembly such as the collar 215, an outer surface of the upper tube 210, an inner surface of the lower tube 205, etc. can include aligned vertically oriented grooves to form the drain 223. The drain 223 allows any water that makes its way into the assembly to drain out. The drain 223 also allows air flow through the assembly, which prevents pressure from building up as the upper tube 210 translates.

The motor shroud 220 houses the motor 230, and a motor o-ring 270 is positioned between the motor 230 and the motor shroud 220. The motor o-ring 270 reduces motor vibration and prevents the motor from vibrating into the motor shroud 220, which in turn reduces the amount of noise produced when the motor is running. In alternative embodiments, additional motor o-rings may be positioned between the motor 230 and the motor shroud 220. Floating the motor (i.e., along its sidewalls) by one or more o-rings allows some movement so that the motor can align well with the entire assembly. If the motor were instead rigidly immovable, any errors in concentricity or angle between assembly components can potentially cause the motor shaft to seize up, rendering the assembly inoperable. In an alternative embodiment, a dampening sheath can surround at least a portion of the motor and can be positioned between the motor housing and the motor shroud 220. The dampening sheath can be made from a rubber (e.g., Sorbothane) or other sound dampening material. The dampening sheath can be used in addition to the motor o-ring(s) or alternative to the motor o-ring(s) depending on the embodiment. In an alternative embodiment, the motor 230 may be rigidly secured to the motor shroud 220, and a shaft coupler can be used to account for any misalignment between the motor 230 and the lead screw 235, as described with reference to FIG. 7. Fasteners 272 are also used to secure the motor 230 to the motor shroud 220 and to prevent the motor from twisting or rotating within the motor shroud 220. The fasteners 272 can be screws, bolts, etc. In one embodiment, the motor 230 can also be held in place axially by an adhesive (e.g., Loctite®) on the threads or other interfaces of the components.

A motor shaft 274 extends from a base of the motor 230. The motor shaft 274 rotates in either a clockwise or counterclockwise direction when the motor 230 is activated. A shaft coupler 276 is mounted to the motor shaft 274 such that the shaft coupler 276 rotates in unison with the motor shaft 274. Similarly, the lead screw 235 is mounted to the shaft coupler 276 such that the lead screw 235 rotates in unison with the shaft coupler 276 and the motor shaft 274. In one embodiment, the motor 230 can be held in place axially by an adhesive (e.g., Loctite®) on the threads or other interfaces of the components. For example, green Loctite® or another adhesive can be applied to the threaded interface between the shaft coupler 276 and the motor shaft 274. In an illustrative embodiment, the shaft coupler 276 contacts an inner race of the motor bearing as a stop to aid in placement and positioning while the adhesive is being applied.

The lead screw 235 can be mounted to the shaft coupler 276 by way of a press fit, one or more fasteners, a threaded connection, a welded or soldered connection, etc. A ball bearing 278 is positioned between the shaft coupler 276 and the inner surface of the motor shroud 220. The ball bearing 278 helps to maintain the shaft coupler 276 in alignment with the motor shaft 274 and the lead screw 235. The ball bearing 278 also enables low friction rotation of the shaft coupler 276.

Figures 2E, 2F:
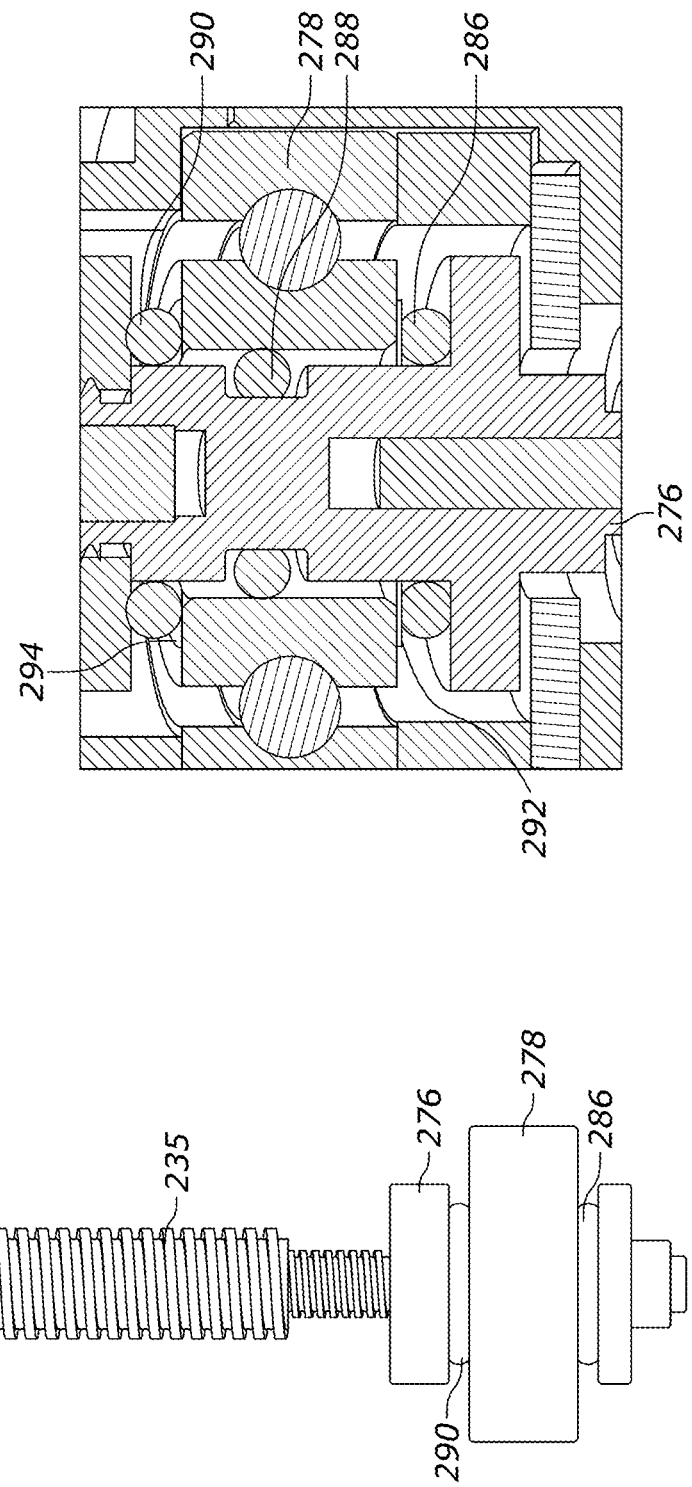
FIG. 2E is a side view of the ball bearing mounted to the shaft coupler in accordance with an illustrative embodiment.
FIG. 2F is a partial close up sectional view depicting placement of o-rings in the motor shroud in accordance with an illustrative embodiment.

In an illustrative embodiment, the ball bearing 278 can be a sealed bearing assembly that includes one or more ball bearings, such as a 608 radial bearing assembly. Alternatively, any other type of radial bearing assembly may be used to bear the axial and radial loads of the dropper post. FIG. 2E is a side view of the ball bearing 278 mounted to the shaft coupler 276 in accordance with an illustrative embodiment. In some implementations, the axial load capability of the ball bearing used may not be high enough to support the weight of the rider or the weight of the bicycle. However, even in such scenarios, the use of o-rings in conjunction with the ball bearing allows the axial load to be through the ball bearing up to when the o-rings become compressed by a certain percentage. This compression percentage depends on the hardness of the material used to make the o-rings. In an illustrative embodiment, the percentage of o-ring compression up to which the axial load flows through the ball bearing is 40%. Alternatively, a different percentage may be used such as 30%, 35%, 45%, 50%, etc. Above this compression percentage, the shaft coupler bottoms out. This limits the maximum axial load on the ball bearing to approximately 20-50 pounds depending on the hardness of the o-rings.

Referring again to FIG. 2D, a thrust bearing (or alternatively a thrust washer) 280 is positioned between a flange of the shaft coupler 276 and the motor shroud 220. The thrust bearing 280 is used to help absorb any downward force placed on the assembly during motor operation. For example, such a downward force may result from a rider sitting on the saddle while the motor is in operation. By absorbing such downward force, the thrust bearing 280 helps protect the motor 230 and the motor shaft 274, and also helps minimize rotational friction that can be caused by the downward force. Positioned between the thrust bearing 280 and the ball bearing 278 is a bearing spacer 282. A shaft coupler nut 284 is positioned within the motor shroud 220 and around an upper portion of the shaft coupler 276.

As also shown in FIG. 2D, a bottom axial load o-ring 286, a radial load o-ring 288, and a top axial load o-ring 290 are positioned around the shaft coupler 276. As described in more detail below, the o-rings in the motor shroud 220 (i.e., the bottom axial load o-ring 286, the radial load o-ring 288, and the top axial load o-ring 290) are used to absorb compressive and other forces imposed upon the system such that the system does not easily bind. The radial load o-ring 288 also constrains the shaft coupler 276 radially. The o-rings in the motor shroud 220 also help to maintain system alignment by keeping other system components in their appropriate positions.

FIG. 2F is a partial close up sectional view depicting placement of the o-rings in the motor shroud 220 in accordance with an illustrative embodiment. As shown, the bottom axial load o-ring 286 is supported by a shim 292 that is positioned between the ball bearing 278 and the bottom axial load o-ring 286. Similarly, the top axial load o-ring 290 is supported by a shim 294 that is positioned between the ball bearing 278 and the top axial load o-ring 290. The shims are used to help prevent the o-rings from being pinched in the gap between the shaft coupler 276 and the ball bearing 278. More specifically, the shim 292 rests upon a bottom surface of the ball bearing 278 and covers at least a portion of the gap between the ball bearing 278 and the shaft coupler 276, and the shim 294 rests upon a top surface of the ball bearing 278 and also covers at least a portion of the gap between the ball bearing 278 and the shaft coupler 276. The shims can be flat components that are the same general size as the o-rings they support.

Figure 3C:
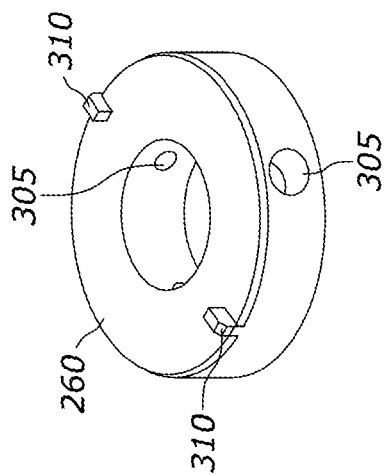
FIG. 3C is a perspective view of the lower nut holder in accordance with an illustrative embodiment.
Figure 3B:
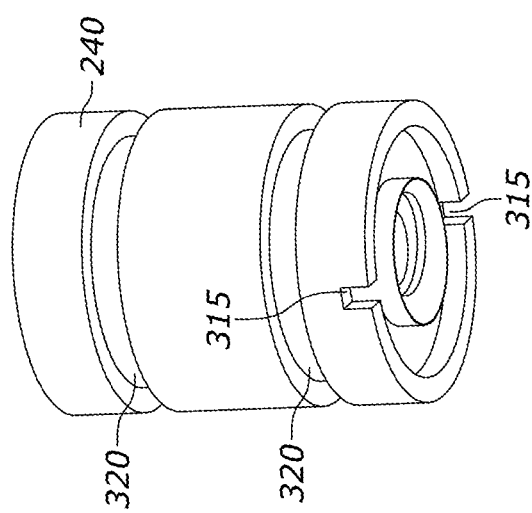
FIG. 3B is a perspective view of the lead screw nut in accordance with an illustrative embodiment.
Figure 3A:
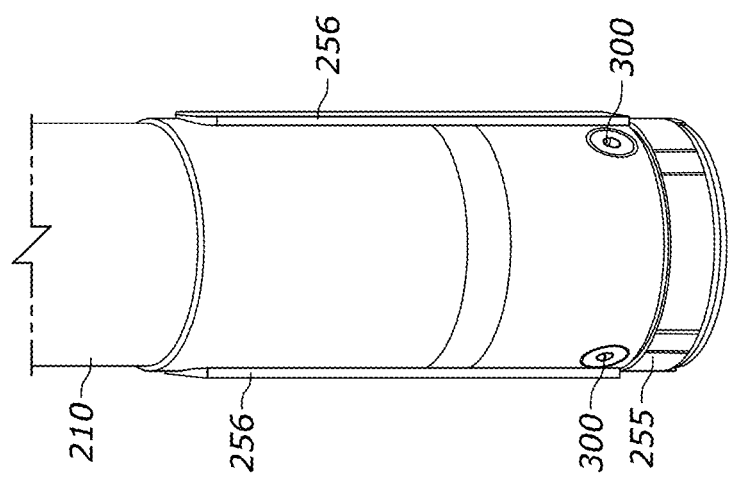
FIG. 3A is a partial view of a lower portion of the upper tube in accordance with an illustrative embodiment.

FIG. 3A is a partial view of a lower portion of the upper tube 210 in accordance with an illustrative embodiment. FIG. 3B is a perspective view of the lead screw nut 240 in accordance with an illustrative embodiment. FIG. 3C is a perspective view of the lower nut holder 260 in accordance with an illustrative embodiment. Fasteners 300 extend through openings in the upper tube 210 and are used to secure the lower nut holder 260 to the upper tube 210 such that the lower nut holder 260 is unable to rotate within the upper tube 210. The fasteners 300 extend into openings 305 in the sidewall of the lower nut holder 260. The fasteners 300 can be threaded screws or bolts. In an illustrative embodiment, three of the fasteners 300 are used. Alternatively, fewer or additional fasteners may be used. In another alternative embodiment, the lower nut holder 260 can be an integral part of the upper tube 210, welded to the upper tube 210, soldered to the upper tube 210, etc.

An upper surface of the lower nut holder 260 includes tabs 310 that are configured to mate with slots 315 on a bottom surface of the lead screw nut 240. The mated interface between the lower nut holder 260 and the lead screw nut 240 prevents the lead screw nut 240 from rotating within the upper tube 210. While two tab/slot pairs are shown, the system can include fewer or additional pairings in alternative embodiments. Also depicted are grooves 320 on an outer surface of the lead screw nut 240. The grooves 320 are configured to receive the radial nut o-rings 266 shown in FIG. 2C. The lead screw nut 240 also includes a lower groove 320 configured to receive the lower nut o-ring 262 (FIG. 2C) and an upper groove (not visible) configured to receive the upper nut o-ring 264 (FIG. 2C).

Figure 4A:
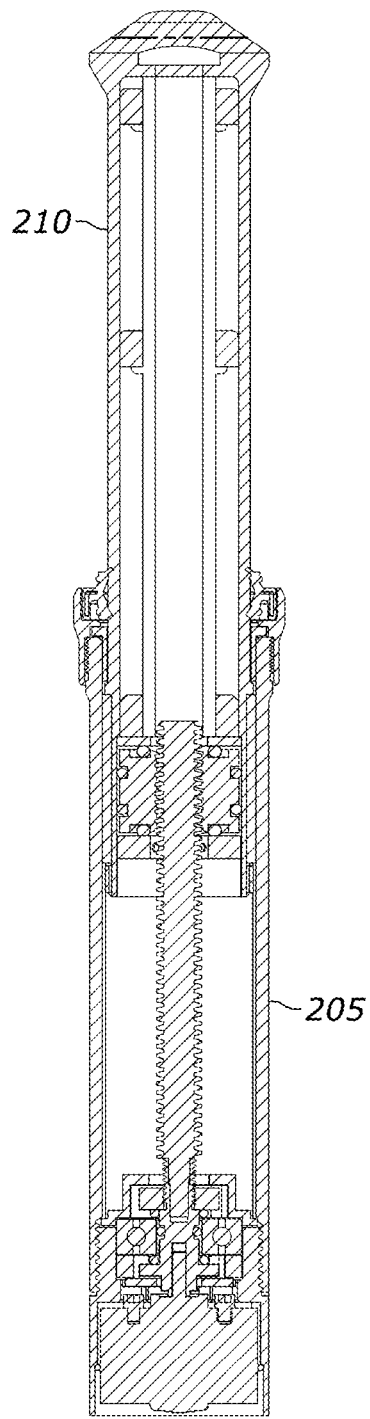
FIG. 4A is a cross-sectional view depicting a top out condition of the motorized dropper post assembly in accordance with an illustrative embodiment.
Figure 4B:
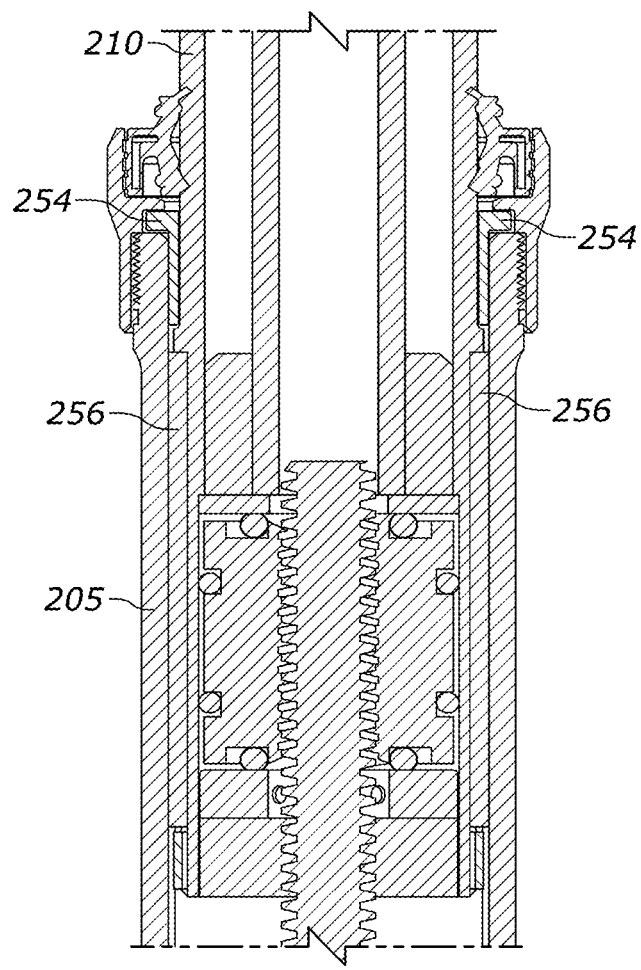
FIG. 4B is a close-up cross-sectional view of a near top out condition in accordance with an illustrative embodiment.

FIG. 4A is a cross-sectional view depicting a top out condition of the motorized dropper post assembly in accordance with an illustrative embodiment. FIG. 4B is a close-up cross-sectional view of a near top out condition in accordance with an illustrative embodiment. In the top out condition, the upper tube 210 is fully extended relative to the bottom tube 205. During extension, the lead screw rotates in unison with the motor shaft. As the lead screw rotates, the lead screw nut threaded onto the lead screw translates upward causing the upper tube 210 to extend outward from the lower tube 205. The top out condition is reached when the anti-rotation keys 256 mounted on an exterior surface of the upper tube 210 make contact with the upper bushing 254. This contact between solid surfaces prevents further upward movement of the upper tube 210 and its components.

Figure 5B:
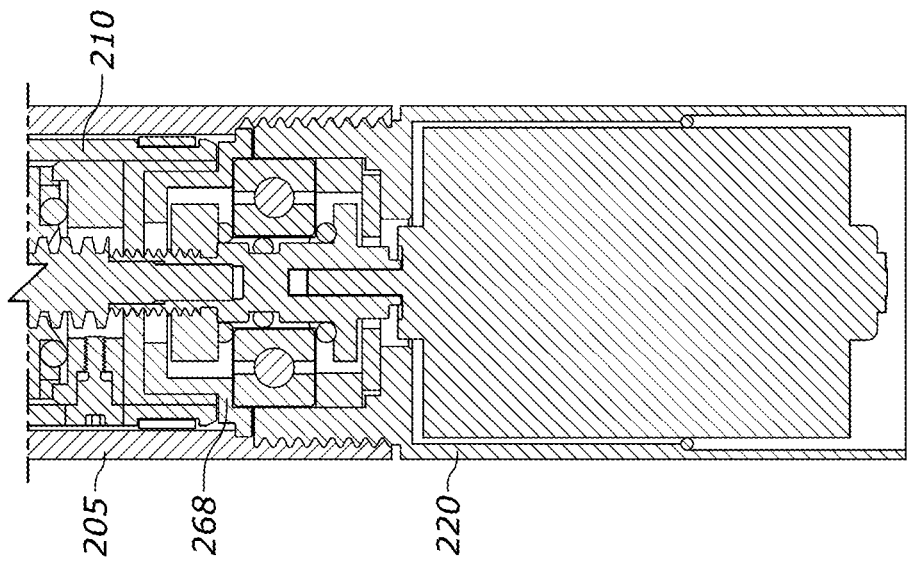
FIG. 5B is a close-up cross-sectional view of the bottom out condition in accordance with an illustrative embodiment.
Figure 5A:
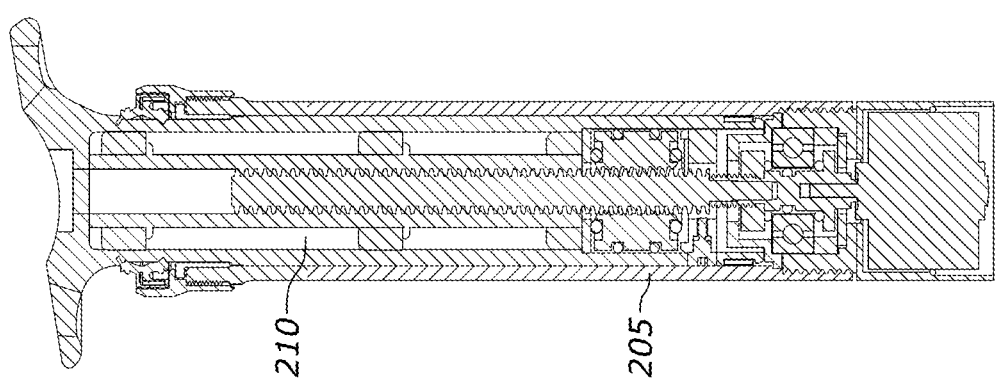
FIG. 5A is a cross-sectional view depicting a bottom out condition of the motorized dropper post assembly in accordance with an illustrative embodiment.

FIG. 5A is a cross-sectional view depicting a bottom out condition of the motorized dropper post assembly in accordance with an illustrative embodiment. FIG. 5B is a close-up cross-sectional view of the bottom out condition in accordance with an illustrative embodiment. In the bottom out condition, the upper tube 210 is in its lowest position and is almost entirely positioned within the lower tube 205. During a lowering operation, the lead screw rotates in an opposite direction of that used to extend the upper tube 210. As the lead screw rotates in this opposite direction, the lead screw nut threaded onto the lead screw is translated downward, causing the upper tube 210 to retract within the lower tube 205. The bottom out condition is reached when a bottom surface of the upper tube 210 contacts the stop 268 on the upper surface of the motor shroud 220. This contact between solid surfaces prevents further downward movement of the upper tube 210 and its components.

Figure 6B:
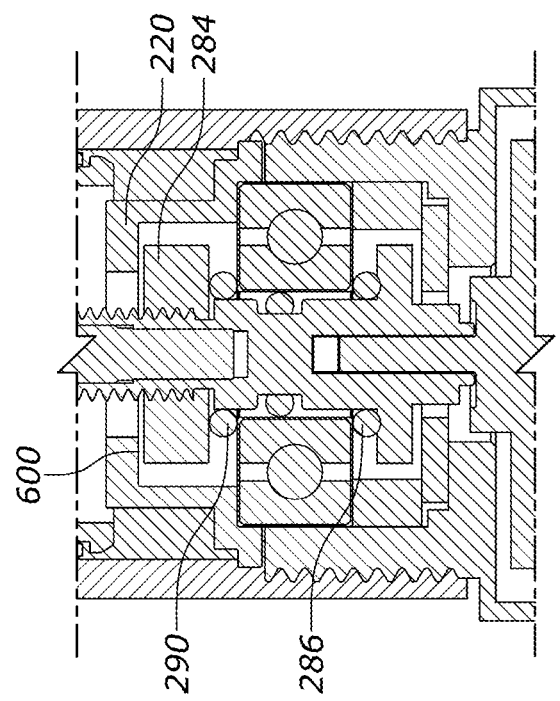
FIG. 6B depicts a cross-section of the shaft coupler portion of the assembly with a downward load on the dropper post assembly in accordance with an illustrative embodiment.
Figure 6A:
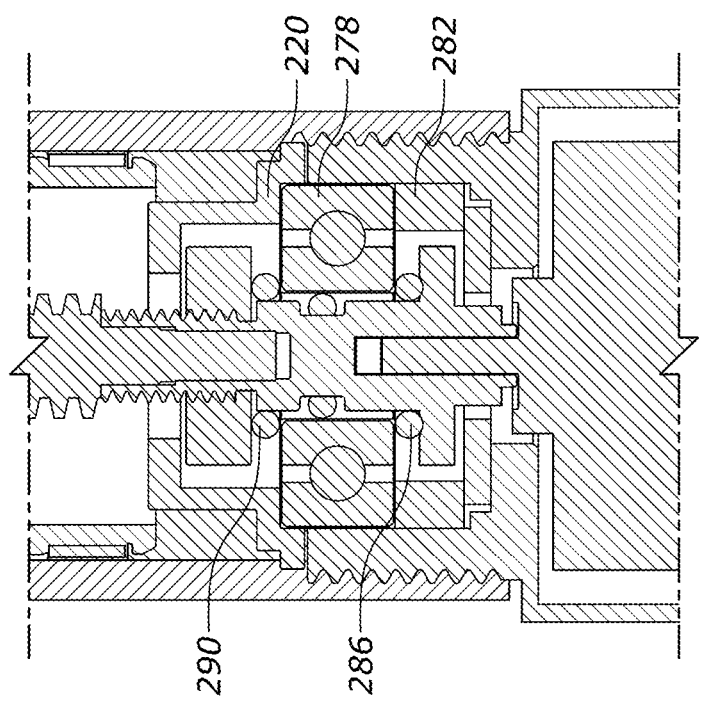
FIG. 6A depicts a cross-section of the shaft coupler portion of the assembly in a resting state in which no load is imposed on the dropper post assembly in accordance with an illustrative embodiment.

FIGS. 6A-6E depict varying states of load on the dropper post assembly. More specifically, FIG. 6A depicts a cross-section of the shaft coupler portion of the assembly in a resting state in which no load is imposed on the dropper post assembly in accordance with an illustrative embodiment. In the resting state, there is very little compression of the bottom axial load o-ring 286 and the top axial load o-ring 290. FIG. 6A also depicts that a portion of the ball bearing 278 is securely mounted between an inner surface of the motor shroud 220 and the bearing spacer 282. This mounting configuration constrains axial movement of the ball bearing 278.

FIG. 6B depicts a cross-section of the shaft coupler portion of the assembly with a downward load on the dropper post assembly in accordance with an illustrative embodiment. This downward load in which the post is being pulled down decreases the size of a gap 600 (as compared to the resting state of FIG. 6A) between the shaft coupler nut 284 and the inner top surface of the motor shroud 220. The bottom axial load o-ring 286 compresses and prevents the gap 600 from fully closing. This clearance (i.e., gap) remains because the force of pulling the post down is smaller than the force it takes to compress the bottom o-ring 286 by 40%. As discussed above, in alternative embodiments a different compression percentage may be used.

Figure 6D:
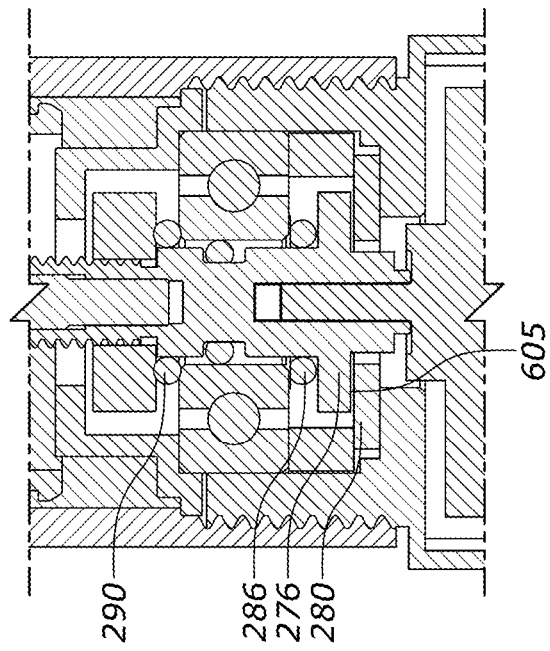
FIG. 6D depicts a cross-section of the shaft coupler portion of the assembly while the post is being raised in accordance with an illustrative embodiment.
Figure 6C:
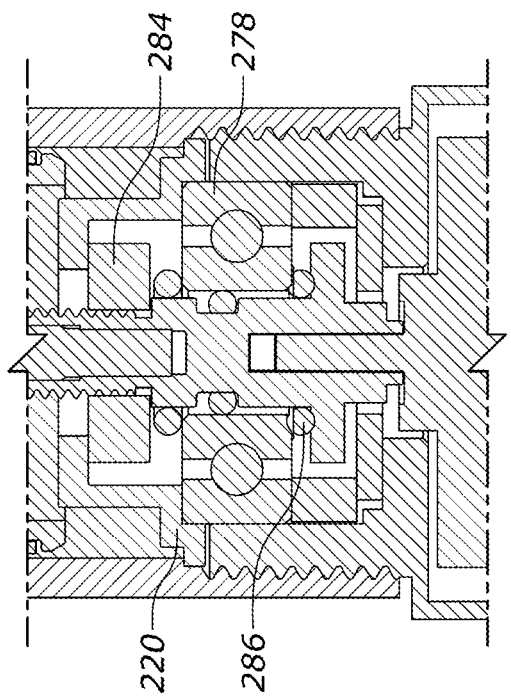
FIG. 6C depicts a cross-section of the shaft coupler portion of the assembly with an upward force applied to the dropper post assembly in accordance with an illustrative embodiment.

FIG. 6C depicts a cross-section of the shaft coupler portion of the assembly with an upward force applied to the dropper post assembly in accordance with an illustrative embodiment. The upward force can result from the bicycle being lifted or held up by the saddle. In this scenario, the gap 600 shown in FIG. 6B closes, limiting the axial load the ball bearing 278 to the force that it takes to compress the lower axial load o-ring 286 by 40%. The force is transmitted upward through the interface between the ball bearing 278 and the inner surface of the motor shroud 220. When in the state of FIG. 6C with the gap 600 closed, a bind will likely result if the motor of the assembly is operated.

FIG. 6D depicts a cross-section of the shaft coupler portion of the assembly while the post is being raised in accordance with an illustrative embodiment. The top axial load o-ring 290 compresses and prevents a gap 605 from closing. The gap 605 is between the thrust bearing 280 and a flange of the shaft coupler portion 276 that supports the bottom axial load o-ring 286. The load imposed while the post is being raised decreases the size of the gap 605 (as compared to the resting state of FIG. 6A), but the gap 605 still remains because the force of raising the post is smaller than the force it takes to compress the top axial load o-ring by 40%.

Figure 6E:
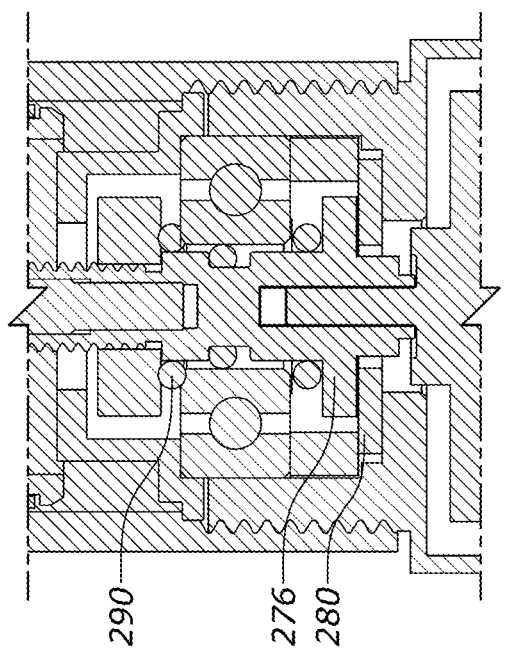
FIG. 6E depicts a cross-section of the shaft coupler portion of the assembly while a rider is seated on the saddle in accordance with an illustrative embodiment.

FIG. 6E depicts a cross-section of the shaft coupler portion of the assembly while a rider is seated on the saddle in accordance with an illustrative embodiment. In this state, the gap 605 is gone and the flange of the shaft coupler portion 276 is in contact with the thrust bearing 280. In an alternative embodiment, the thrust bearing 280 can be a bronze thrust washer. If a rider sits on the saddle while the saddle is being lowered, the interface between the shaft coupler portion 276 and the thrust bearing 280 will see high load as the motor is spinning. Also, with the gap 605 closed, the axial load on the ball bearing is limited to the force it takes to compress the top axial load o-ring 290 by 40%.

In an illustrative embodiment, a user can control the motorized dropper post assembly with a switch, button, lever, or other control that actuates and stops the motor. The control, which can be mounted anywhere on the bicycle, is connected to the rest of the assembly by one or more wires. In at least some embodiments, the assembly can include a computing system that includes at least a processor and a memory. The memory can be used to store algorithms, software, etc. in the form of computer-readable instructions to perform any of the operations described herein. Upon execution of the computer-readable instructions by the processor, the computing system performs the operations to control the assembly. The computing system can also include an interface that allows the user or installer to interact with the controller. In addition to the aforementioned control (i.e., switch, etc.), the interface may include a display that allows the user to enter control information. The computing system can further include a transceiver that enables wireless communications between the computing system and a user device. The transceiver enables remote control and/or programming of the assembly. The computing system can be mounted within the lower tube 205 or the upper tube 210 of the assembly. Alternatively, the computing system may be mounted proximate to the control that allows the user to operate the assembly.

In one embodiment, one or more limit switches and/or one or more sensors may be used to control the height of the dropper post in response to a user command. In another embodiment, no limit switches or sensors are used to indicate the position of the post. Instead, the assembly can utilize hall effect sensors, and accompanying software to monitor the hall effect sensors and determine the position of the post based on the monitoring of hall effect transitions. In an illustrative embodiment, the software can be firmware included in the computing system of the motorized dropper post assembly. In one implementation, controlling the height of the post can include first performing a limit setting routine to identify the lower limit (i.e., bottom out) and upper limit (i.e., top out) of the assembly.

To conduct the limit setting routine, the post can be moved slowly downward until it is stopped at the bottom due to contact between the stop on the motor assembly and the bottom of the upper tube. In some embodiments, this lowering can be done by supplying a limited current to the motor such that the lead screw does not rotate too rapidly or with too much force and cause the assembly to bind. The computing system of the assembly detects that the upper tube has come to a stop after an amount of time (e.g., 0.1 seconds, 0.5 seconds, 1 second, etc.) has passed without a hall effect sensor transition. That point is set as the bottom. The dropper post is then raised (with a limited or full current) and the computing system detects the number of hall effect transitions that occur during movement of the dropper post from its lowest position to its highest position. This information can also be stored in a memory of the computing system (e.g., non-volatile memory, etc.). In an alternative embodiment, the limit setting routine can start at the highest position and determine the number of hall effect transitions that occur as the dropper post travels to the lowest position.

With this information, the computing system can keep track of the dropper post height. For example, if the dropper post starts at the top and travels down until one half of the total number of hall effect transitions occurs, the computing system can determine that the dropper post is halfway between the lowest position and the highest position. In one embodiment, the computing system can deactivate the motor if the user attempts to go past the lowest/highest position determined during the limit setting routine. If the post is driven too hard into the top out or bottom out position, the lead screw nut and the lead screw can tighten too much and bind. Once a bind occurs, the motor may be unable rotate the lead screw in either direction. In such a situation, the user can loosen the motor shroud or the top of the assembly to relieve the pressure such that the motor is again able to freely rotate the lead screw.

Figure 7A:
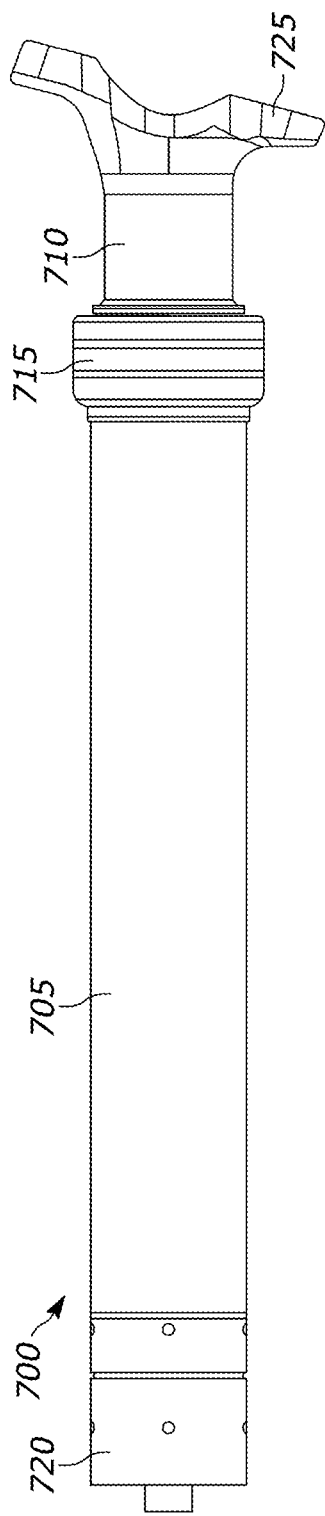
FIG. 7A is a side view of a motorized dropper assembly in accordance with another illustrative embodiment.
Figure 7B:
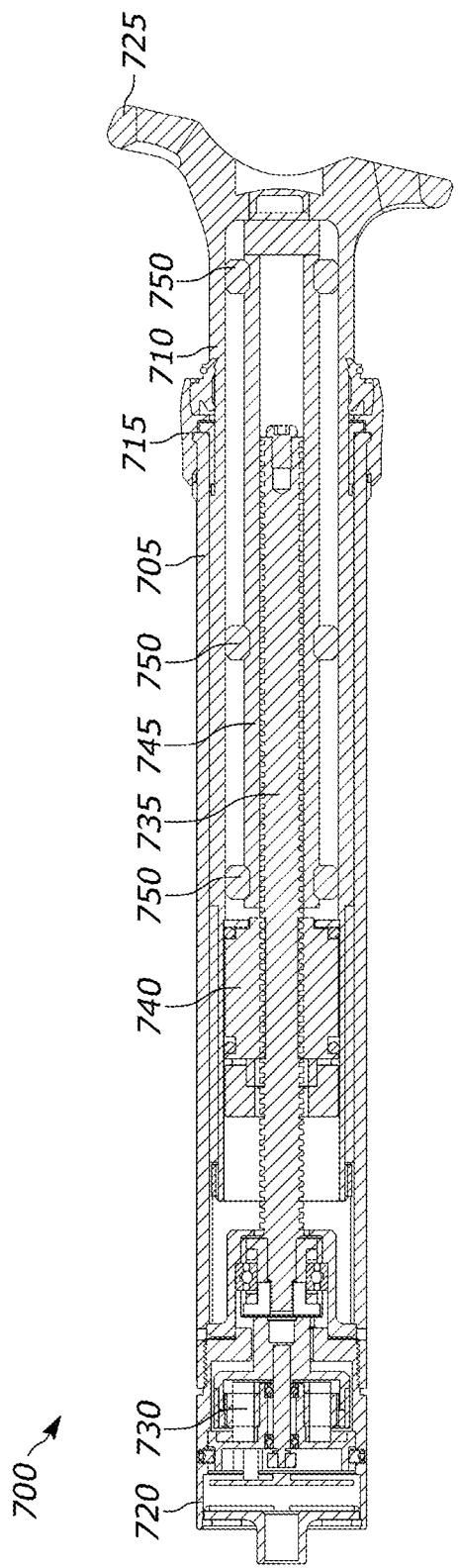
FIG. 7B is a cross-sectional side view of the motorized dropper assembly in accordance with an illustrative embodiment.

FIG. 7A is a side view of a motorized dropper assembly 700 in accordance with another illustrative embodiment. FIG. 7B is a cross-sectional side view of the motorized dropper assembly 700 in accordance with an illustrative embodiment. The motorized dropper assembly 700 includes a lower tube 705, an upper tube 710 that slidably mates with the lower tube 705, a collar 715 at the interface between the lower tube 705 and the upper tube 710, and a motor shroud 720 that is used to house and secure a motor. The motorized dropper post assembly 700 also includes a saddle bracket 725 to which a saddle can be mounted. In one embodiment, the lower tube 705 and the upper tube 710 can be made of carbon fiber, stainless steel, aluminum, etc.

Upon activation of a motor within the assembly, the upper tube 710 moves up or down relative to the lower tube 705 such that a saddle mounted to the saddle bracket 725 can be adjusted to a desired height for a given rider. In an illustrative embodiment, the collar 715 includes one or more components that form a seal between the upper tube 710 and the lower tube 705 to prevent dirt, dust, water, etc. from getting inside of the assembly. The collar 715 can also be used to secure the assembly to a seat tube of the bicycle frame. For example, in one embodiment, the collar 715 can include a first set of threads that secure the collar 715 to the lower tube 705 and a second set of threads that secure the collar 715 to the saddle tube of the bicycle frame.

As shown in the cross-sectional view of FIG. 7B, the motorized dropper post assembly 700 includes a motor 730, a lead screw 735, a lead screw nut 740, a lead screw sheath 745, and a plurality of noise dampening rings 750. The motor 730 is mounted to and secured by the motor shroud 720, and the motor shroud 720 is mounted to the lower tube 705. The motor 730 is also attached to the lead screw 735 such that rotation of the motor shaft results in corresponding rotation of the lead screw 735. The lead screw nut 740 is mounted to the upper tube 710 and is also threaded onto the lead screw 735 such that rotation of the lead screw 735 causes the lead screw nut 740 (and the upper tube 710 to which the lead screw nut 740 is mounted) to translate up or down depending on the direction of rotation of the lead screw 735. In an illustrative embodiment, the lead screw nut 740 is made from plastic, rubber, or another non-metallic material to reduce the amount of noise made as the lead screw 735 rotates. Alternatively, a different material may be used to form the lead screw nut 740, such as carbon, stainless steel, etc.

The lead screw sheath 745 is used to provide structural support for the lead screw 735, to maintain alignment of the lead screw 735, and to dampen noise generated by rotation of the lead screw 735. The added structural support of the lead screw sheath 745 reduces the risk of the lead screw bending during impact to the assembly. An interior surface of the lead screw sheath 745 can be threaded or unthreaded, depending on the embodiment. In an illustrative embodiment, the lead screw sheath 745 can be made of polyoxymethylene (POM) or another polymer such as Delrin®. Alternatively, other material(s) may be used to form the lead screw sheath 245, such as acetal, polyacetal, other polyoxymethylene compounds, a cellular polyurethane elastomer, etc.

The noise dampening rings 750 are positioned between an inner wall of the upper tube 710 and the lead screw sheath 745. The noise dampening rings 750 are used to provide structural support for the lead screw sheath 745 and also to dampen vibrations in the assembly to reduce the noise generated when the lead screw rotates. In some embodiments, the lead screw sheath 745 can include grooves that support c-clips, and the c-clips can be used to hold the noise dampening rings 750 in place. An exterior surface of the lead screw sheath 745 can also include tabs, rings, or other protrusions configured to support and the noise dampening rings 750. In one embodiment, the noise dampening rings 750 can be made from Sorbothane®. Alternatively, a different material may be used such as a different type of synthetic viscoelastic urethane polymer, rubber, polyurethane, cellular polyurethane elastomer, etc. While the embodiment shown includes 3 noise dampening rings, it is to be understood that a different number may be used in alternative embodiments. For example, 1, 2, 4, 5, 6, etc. noise dampening rings can be positioned within the upper tube in alternative implementations. In an alternative embodiment, an entire inner surface of the upper tube 710 can be covered with a single large dampening ring and/or a noise dampening coating.

Figure 7D:
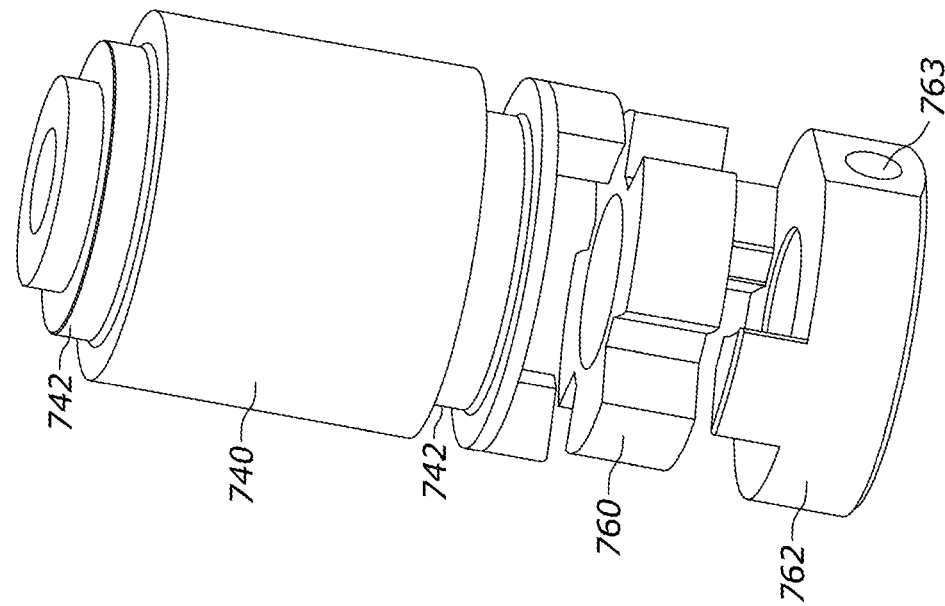
FIG. 7D is an expanded view of an assembly for the lead screw nut in accordance with an illustrative embodiment.
Figure 7C:
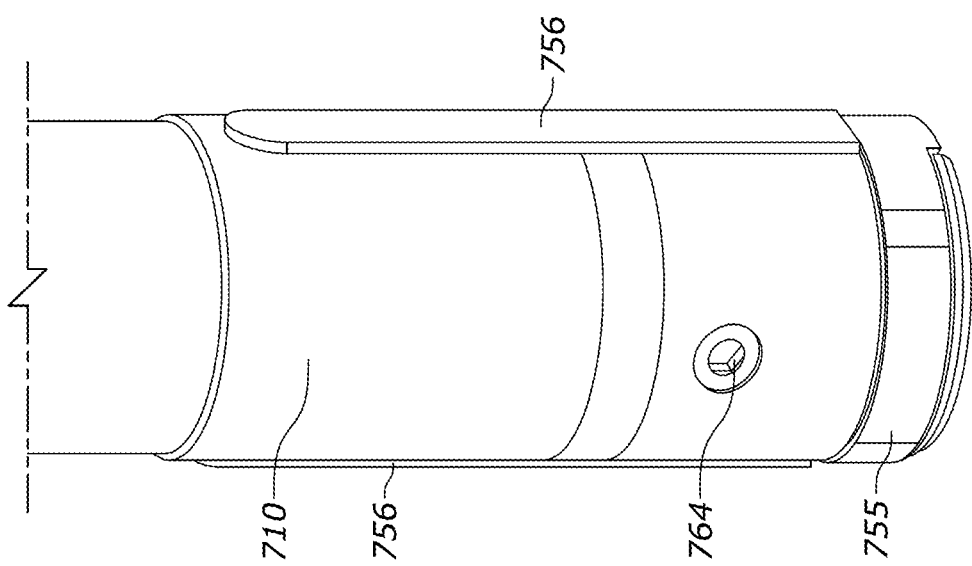
FIG. 7C is a partial view of a lower portion of the upper tube in accordance with an illustrative embodiment.

FIG. 7C is a partial view of a lower portion of the upper tube 710 in accordance with an illustrative embodiment. FIG. 7D is an expanded view of an assembly for the lead screw nut 740 in accordance with an illustrative embodiment. FIG. 7E is a partial cross-sectional view of the motorized dropper post assembly depicting the lead screw nut in accordance with an illustrative embodiment. As shown in FIG. 7D, the assembly includes a nut holder 760, a nut lock 762, and the lead screw nut 740, all of which include a central opening that is designed to receive the lead screw 735. In one embodiment, the nut holder 760 is made from a cellular polyurethane elastomer such as Cellasto. Alternatively, a different material may be used. As shown, the nut lock 762 includes a pair of extensions (or tabs) that mate with a first pair of openings (or grooves) in the nut holder 760, and the nut holder 760 has a second pair of openings (or grooves) that mate with a pair of extensions (or tabs) on the lead screw nut 740. As such, the lead screw nut 740 is securely mounted to both the nut holder 760 and the nut lock 762, which prevents rotation of the lead screw nut 740.

The nut lock 762 also includes an opening 763 that is configured to receive a fastener 764. The fastener 764 extends through an opening in the upper tube 710 and into the opening 763 of the nut lock 762. The fastener 764 is used to secure the nut lock 762 to the upper tube 710 such that the nut lock 762 (and the lead screw nut 740 attached thereto) is unable to rotate within the upper tube 710. The fastener 764 can be a threaded screw or bolt in one embodiment. Alternatively, the nut lock 762 may be permanently mounted to the upper tube 710. Although one fastener 764 and corresponding opening 763 are shown, it is to be understood that a different number of fasteners may be used such as 2, 3, 4, etc. As shown in FIG. 7D, an outer surface of the lead screw nut 740 includes grooves 742 that are designed to receive radial nut o-rings 743, as described herein. As best shown in FIG. 7E, a portion of the groove 742 that holds the upper nut o-ring 743 is formed by an upper nut holder 744 that mounts to the top of the lead screw nut 740.

As shown in FIG. 7C, a pair of anti-rotation keys 756 are mounted to the outer surface of the upper tube 710. In an illustrative embodiment, the anti-rotation keys 756 mate with corresponding grooves on the interior surface of the lower tube 705 such that the upper tube 710 is unable to rotate relative to the lower tube 705. While two anti-rotation keys are depicted, alternative embodiments may include fewer or additional anti-rotation keys, such as 1, 3, 4, 5, etc. Additionally, a lower bushing 755 is mounted to a bottom portion of the upper tube 710 and moves in unison with the upper tube 710. The lower bushing 755 forms the interface between the bottom portion of the upper tube 710 and the inner surface of the lower tube 705.

Figure 7F:
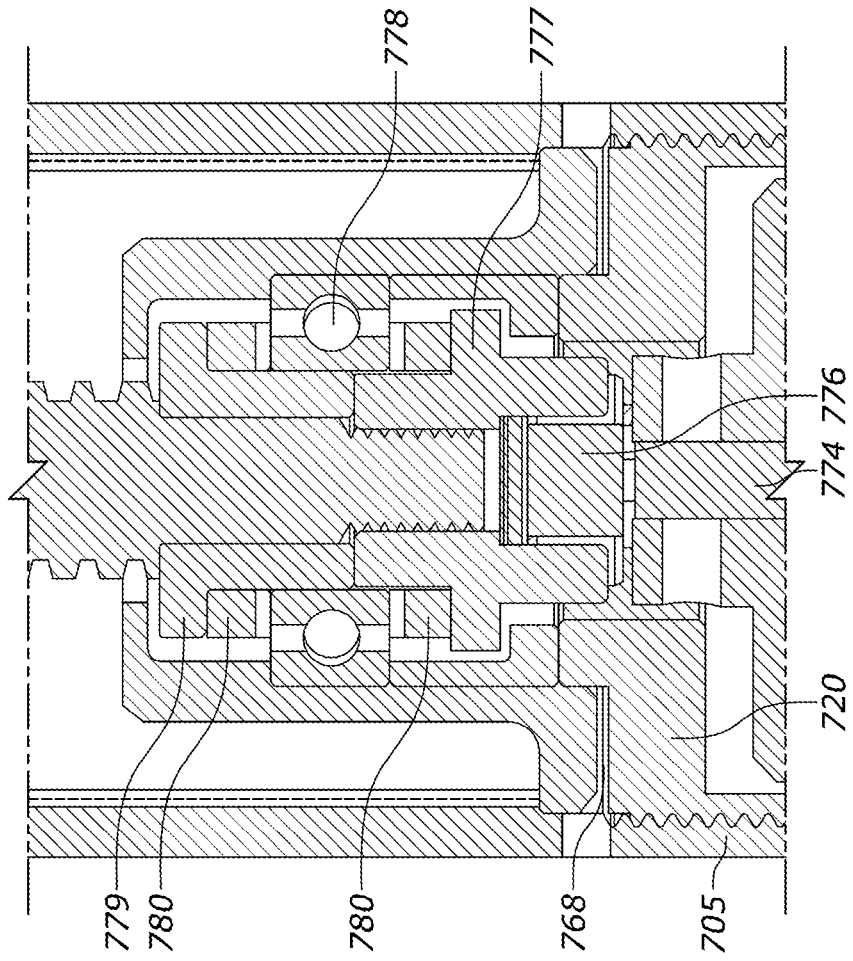
FIG. 7F is a partial cross-sectional view of a lower portion of the lower tube in accordance with an illustrative embodiment.
Figure 7E:
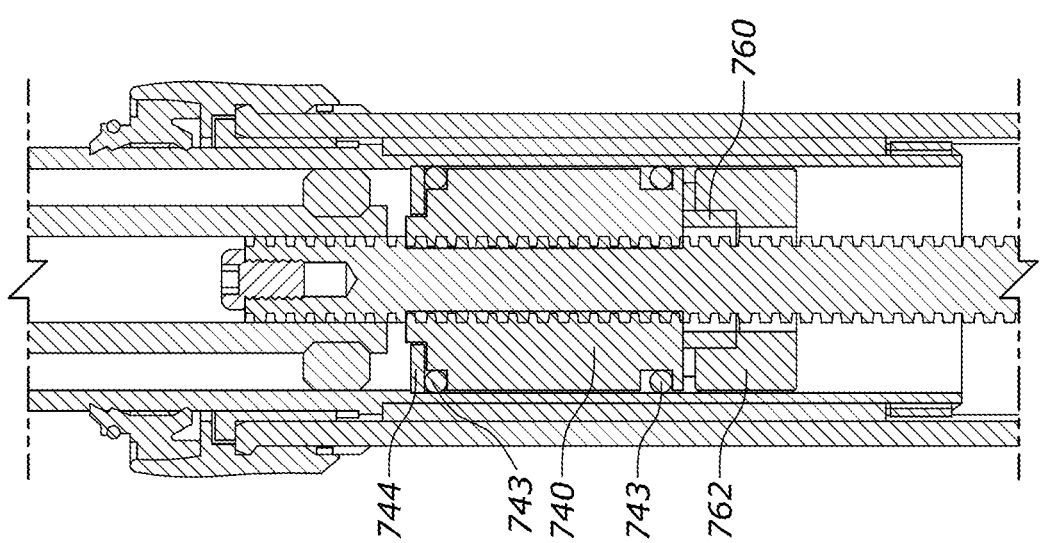
FIG. 7E is a partial cross-sectional view of the motorized dropper post assembly depicting the lead screw nut in accordance with an illustrative embodiment.
Figure 7H:
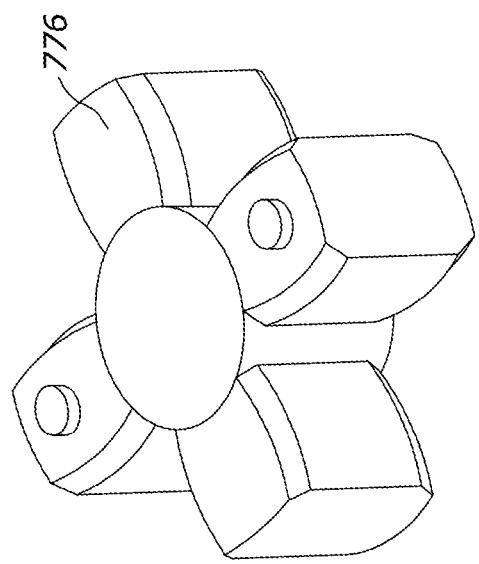
FIG. 7H depicts a thrust absorber for the motor assembly in accordance with an illustrative embodiment.
Figure 7G:
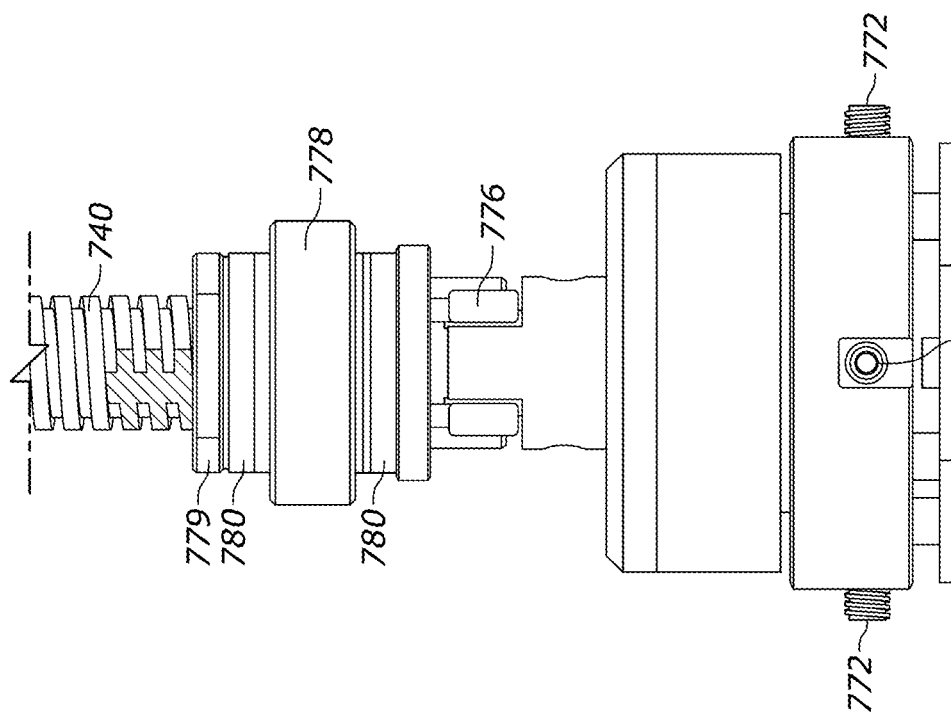
FIG. 7G is a perspective view of the motor assembly (including a portion of the lead screw) in accordance with an illustrative embodiment.
Figure 7I:
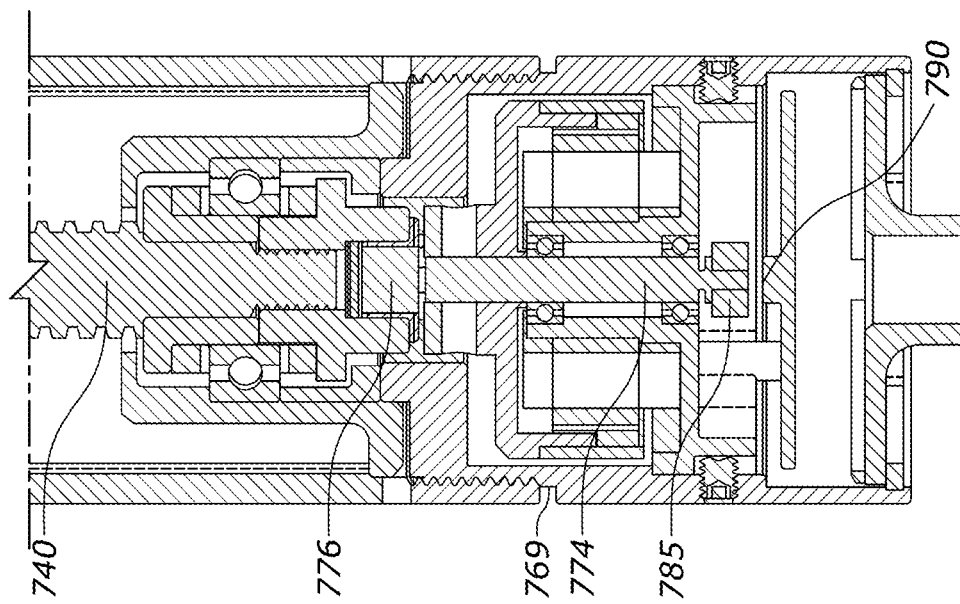
FIG. 7I is a cross-sectional view of the motor assembly in accordance with an illustrative embodiment.

FIG. 7F is a partial cross-sectional view of a lower portion of the lower tube 705 in accordance with an illustrative embodiment. FIG. 7G is a perspective view of the motor assembly (including a portion of the lead screw) in accordance with an illustrative embodiment. FIG. 7H depicts a thrust absorber 776 for the motor assembly in accordance with an illustrative embodiment. FIG. 7I is a cross-sectional view of the motor assembly in accordance with an illustrative embodiment. As shown, the motor shroud 720 is threaded into threads positioned on the inner surface of the lower portion of the lower tube 705. In alternative embodiments, the motor shroud 720 can be mounted to the lower tube 705 by a different method, such as latches, one or more fasteners, adhesive, etc. As shown, an upper portion of the motor shroud 720 includes a stop 768 that is designed to contact a surface of a retainer 779 (described below) to transfer an axial load to the post as opposed to a ball bearing 778 of the system during system compression.

A drain 769 (depicted in FIG. 7I) is formed between the lower tube 705 and the motor shroud 720. In an illustrative embodiment, components of the assembly such as the collar 715, an outer surface of the upper tube 710, an inner surface of the lower tube 705, etc. can include aligned vertically oriented grooves to form the drain 769. The drain 769 allows any water that makes its way into the assembly to drain out. The drain 769 also allows air flow through the assembly, which prevents pressure from building up as the upper tube 710 translates.

In an illustrative embodiment, the motor 730 can be rigidly secured to the motor shroud 720 (i.e., including the sidewalls), and the shaft coupling assembly can be used to account for any misalignment between the motor 730 and the lead screw 735. Specifically, fasteners 772 are used to secure the motor 730 to the motor shroud 720 and to prevent the motor from twisting or rotating within the motor shroud 720. The fasteners 772 can be screws, bolts, etc. In one embodiment, the motor 730 can also be held in place axially by an adhesive (e.g., Loctite®) on the threads or other interfaces of the components.

A motor shaft 774 extends from a base of the motor 730. The motor shaft 774 rotates in either a clockwise or counterclockwise direction when the motor 730 is activated. The shaft coupling assembly forms an interface between the motor shaft 774 and the lead screw 735 such that the motor shaft 774 and the lead screw 735 rotate in unison with one another. The shaft coupling assembly for the motor shaft 774 and lead screw 735 includes the thrust absorber 776 and a lead screw holder 777 that mate with one another. The lead screw holder 777 is designed to mount to an end of the lead screw 735. The thrust absorber 776 can be formed from a cellular polyurethane elastomer or any other suitable material. The coupling assembly also includes a retainer 779 that is mounted within an upper portion of the motor shroud 720 and designed to prevent longitudinal movement of the lead screw 735. A ball bearing 778 is positioned between an inner surface of the upper portion of the motor shroud 720 and a surface of the retainer 779. The ball bearing 778 is also in contact with the lead screw holder 777. The ball bearing 778 helps to maintain the shaft coupling assembly in alignment with the motor shaft 774 and the lead screw 735. The ball bearing 778 also enables low friction rotation of the shaft coupling assembly.

In an illustrative embodiment, the ball bearing 778 can be a sealed bearing assembly that includes one or more ball bearings, such as a 608 radial bearing assembly. Alternatively, any other type of radial bearing assembly may be used. In some implementations, the axial load capability of the ball bearing used may not be high enough to support the weight of the rider or the weight of the bicycle. However, even in such scenarios, the use of o-rings (or other supports) 780 in conjunction with the ball bearing allows the axial load to be through the ball bearing up to when the o-rings 780 become compressed far enough that either the lead screw holder 777 makes contact with a stop 771 or the retainer 779 makes contact with the stop 768. When this occurs, the axial load is transferred into the post and not into the ball bearing 778 or the motor 730. This compression percentage depends on the hardness of the material used to make the o-rings 780. In an illustrative embodiment, the percentage of o-ring compression up to which the axial load flows through the ball bearing is 40%. Alternatively, a different percentage may be used such as 30%, 35%, 45%, 50%, etc. Above this compression percentage, the shaft coupler bottoms out. This limits the maximum axial load on the ball bearing to approximately 20-50 pounds depending on the hardness of the o-rings 780. In an illustrative embodiment, the o-rings 780 are made of Cellasto or another cellular polyurethane elastomer. Alternatively, a different material may be used.

In an illustrative embodiment, the thrust absorber 776 is used to help absorb any downward force placed on the assembly during motor operation. For example, such a downward force may result from a rider sitting on the saddle while the motor is in operation. By absorbing such downward force, the thrust absorber 776 helps protect the motor 730 and the motor shaft 774, and also helps minimize rotational friction that can be caused by the downward force.

As shown in FIG. 7I, a magnet 785 is mounted to an end of the motor shaft 774. The magnet 785 can be a diametrically magnetized magnet in accordance with an illustrative embodiment. Alternatively, any other type of magnet that can be used to track rotation may be used. A hall effect angle sensor 790 is mounted proximate to the magnet 785. As the motor shaft 774 rotates, the hall effect angle sensor 790 senses and tracks rotation of the magnet 785. Alternatively, a different type of sensor may be used. This allows the assembly to very accurately keep track of the position of the height of the saddle post based on number of rotations. In one embodiment, the assembly can include or be in communication with a computing system that tracks the saddle post position based on sensed data from the hall effect angle sensor 790. The computing system, which can include a processor, memory, interface, transceiver, etc., can be used to prevent the saddle post from being over extended or over compressed. For example, if the processor of the computing system determines that the number of rotations in a given direction (i.e., clockwise or counterclockwise) is about to exceed a threshold that would result in over compression/extension, the processor can prevent the motor from turning any further in the direction of concern. Specifically, the processor can cut power to the motor, switch the motor off, etc. The threshold in each direction and operating instructions for the processor can be stored in the memory.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A dropper post assembly comprising:
   a lower tube;
   an upper tube slidably mounted to the lower tube;
   a motor with a motor shaft that rotates bi-directionally;
   a lead screw directly or indirectly mounted to the motor shaft such that the lead screw rotates in unison with the motor shaft;
   a lead screw nut threaded onto the lead screw and mounted within the upper tube such that the lead screw nut is unable to rotate relative to the upper tube;
   a lead screw sheath configured to receive at least a portion of the lead screw that extends past an upper end of the lead screw nut; and
   one or more noise dampening rings positioned between an inner wall of the upper tube and the lead screw sheath.

2. The dropper post assembly of claim 1, wherein the lead screw nut is made from a non-metallic material.

3. The dropper post assembly of claim 1, wherein the one or more noise dampening rings are made from rubber or a synthetic viscoelastic urethane polymer.

4. The dropper post assembly of claim 1, further comprising a magnet mounted to the motor shaft and a sensor mounted proximate to the magnet, wherein the sensor is configured to determine a number of rotations of the motor shaft based on movement of the magnet.

5. The dropper post assembly of claim 1, further comprising a dampening sheath that surrounds at least a portion of the motor, wherein the dampening sheath is positioned between a housing of the motor and a motor shroud mounted to the lower tube.

6. The dropper post assembly of claim 1, comprising a lower nut holder mounted within the upper tube on a bottom side of the lead screw nut and an upper nut holder mounted within the upper tube on a top side of the lead screw nut, and further comprising one or more fasteners that secure the lower nut holder to the upper tube.

7. The dropper post assembly of claim 6, further comprising an upper nut o-ring mounted in a groove on the top side of the lead screw nut such that the upper nut o-ring is positioned between the lead screw nut and the upper nut holder.

8. The dropper post assembly of claim 6, further comprising a lower nut o-ring mounted in a groove on the bottom side of the lead screw nut such that the lower nut o-ring is positioned between the lead screw nut and the lower nut holder.

9. The dropper post assembly of claim 6, wherein an upper surface of the lower nut holder includes one or more tabs and the bottom side of the lead screw nut includes one or more slots configured to mate with the one or more tabs.

10. The dropper post assembly of claim 1, further comprising one or more radial nut o-rings mounted in one or more corresponding grooves in a side of the lead screw nut such that the one or more radial nut o-rings are positioned between the lead screw nut and an inner surface of the upper tube.

11. The dropper post assembly of claim 1, further comprising:
    a shaft coupling assembly mounted to the motor shaft and to the lead screw; and
    a ball bearing assembly mounted such that the ball bearing assembly surrounds at least a portion of the shaft coupling assembly.

12. The dropper post assembly of claim 11, further comprising a shaft coupler nut mounted to the shaft coupler and a top axial load o-ring mounted around the shaft coupler and positioned between the ball bearing assembly and the shaft coupler nut.

13. The dropper post assembly of claim 12, further comprising a bottom axial load o-ring mounted around the shaft coupling assembly and positioned between a flange of the shaft coupling assembly and the ball bearing assembly.

14. The dropper post assembly of claim 13, further comprising a motor shroud mounted to the lower tube, wherein the motor shroud houses the motor, the motor shaft, the ball bearing assembly, and at least a portion of the shaft coupling assembly.

15. The dropper post assembly of claim 13, wherein the shaft coupling assembly further comprises a thrust bearing or a thrust absorber.

16. The dropper post assembly of claim 13, further comprising a first shim mounted between the top axial load o-ring and the ball bearing assembly and a second shim mounted between the bottom axial load o-ring and the ball bearing assembly.

17. The dropper post assembly of claim 1, further comprising one or more anti-rotation keys mounted to an outer surface of the upper tube, wherein an inner surface of the lower tube includes one or more grooves configured to mate with the one or more anti-rotation keys.

18. The dropper post assembly of claim 17, further comprising:
   an upper bushing mounted to the lower tube, wherein an interface between the upper bushing and the one or more anti-rotation keys acts as a stop to prevent further extension of the upper tube relative to the lower tube; and
   a motor shroud configured to house the motor, wherein an upper surface of the motor shroud acts as a stop that contacts a bottom surface of the upper tube and prevents further lowering of the upper tube relative to the lower tube.

19. The dropper post assembly of claim 1, wherein the lead screw sheath is made from polyoxymethylene (POM), acetal, or polyacetal.

* * * * *